(12) United States Patent
Sakaray et al.

(10) Patent No.: US 11,605,846 B2
(45) Date of Patent: Mar. 14, 2023

(54) LIQUID COOLED THERMAL MANAGEMENT SYSTEM AND RELATED METHOD OF CONTROLLING THE LIQUID COOLED THERMAL MANAGEMENT SYSTEM

(71) Applicant: Caterpillar Inc., Peoria, IL (US)

(72) Inventors: Umakanth Sakaray, Dunlap, IL (US); Nirag Sheth, Peoria, IL (US); Adam C. Grove, Washington, IL (US); John M. Tanner, Dunlap, IL (US); Jeremy Byrd, West Lafayette, IN (US); Gregory S. Hasler, Pekin, IL (US)

(73) Assignee: Caterpillar Inc., Peoria, IL (US)

( * ) Notice: Subject to any disclaimer, the term of this patent is extended or adjusted under 35 U.S.C. 154(b) by 207 days.

(21) Appl. No.: 16/986,989

(22) Filed: Aug. 6, 2020

(65) Prior Publication Data

US 2022/0045380 A1    Feb. 10, 2022

(51) Int. Cl.
*H01M 10/617* (2014.01)
*H01M 10/6568* (2014.01)
*H01M 10/613* (2014.01)

(52) U.S. Cl.
CPC ....... *H01M 10/617* (2015.04); *H01M 10/613* (2015.04); *H01M 10/6568* (2015.04)

(58) Field of Classification Search
CPC ........... H01M 10/6568; H01M 10/617; H01M 10/613; H01M 10/625; H01M 10/633; H01M 10/635; H01M 10/6556; H01M 10/667
See application file for complete search history.

(56) References Cited

U.S. PATENT DOCUMENTS

2015/0194711 A1*  7/2015  Rawlinson .......... H01M 10/625
                                                      429/62
2018/0345815 A1* 12/2018  Porras .................... B60L 58/27
2019/0292973 A1   9/2019  Jiang et al.

FOREIGN PATENT DOCUMENTS

DE    102013009749    12/2014
DE    102014115377     4/2015
DE    102018118524     2/2019
(Continued)

OTHER PUBLICATIONS

Machine translation of DE 102013009749 (Year: 2014).*

*Primary Examiner* — Eugenia Wang
(74) *Attorney, Agent, or Firm* — Bookoff McAndrews, PLLC

(57) ABSTRACT

In one aspect, a thermal management system includes a first coolant circuit, through which a first coolant circulates, and including at least a radiator for cooling the first coolant, a storage containing one or more power electronics, a heat exchanger, and a thermostatic valve that outputs the first coolant to at least one of the storage containing the one or more power electronics and the heat exchanger. A second coolant circuit, through which a second coolant circulates, includes the heat exchanger configured to cool the second coolant using the first coolant, an energy storage unit cooled by the second coolant, and a refrigeration unit configured to cool the second coolant. A coolant temperature sensor outputs a temperature of the coolant in the second coolant circuit, and a controller controls at least the refrigeration unit based on the temperature of the coolant output by the coolant temperature sensor.

20 Claims, 5 Drawing Sheets

(56) References Cited

FOREIGN PATENT DOCUMENTS

WO  2018208208 A1  11/2018
WO  2019039990     2/2019

* cited by examiner

LIQUID COOLED THERMAL MANAGEMENT SYSTEM AND RELATED METHOD OF CONTROLLING THE LIQUID COOLED THERMAL MANAGEMENT SYSTEM

TECHNICAL FIELD

The present disclosure relates generally to a liquid cooled thermal management system for cooling battery storage, and a related method of controlling the liquid cooled thermal management system.

BACKGROUND

Diesel fuel is typically used to power land drilling rigs. Natural gas is an attractive alternative due to lower emissions, lower cost, and widespread availability of natural gas produced at drilling sites. Unlike diesel powered generator sets (gensets), however, transient response of a natural gas genset is inadequate to accept large load changes on a drill rig unless combined with an energy storage system. Back-up energy sources may be used in other applications, such as remote medical facilities or in vehicles. A back-up energy source, made of, for example, lithium ion batteries, is used to supplement power supplied to the drilling rig when natural gas engines are unable to accept the load. Batteries, as an example of a back-up energy source, are designed to operate within a specific temperature range, e.g., 10° C. to 30° C., and, therefore, may need to be heated when ambient temperature is low, and cooled when ambient temperature is high. In addition, because batteries generate heat during use, the batteries may need to be cooled intermittently, as excess heat can degrade performance, safety, and operating life of the back-up energy source.

As an example of a cooling system for an electric power unit of a machine, International Patent Application Publication No. WO2018/208208 (the "'208 publication") describes a cooling arrangement for an electric machine, an electric storage, and power electronics of a hybrid vehicle. The cooling arrangement has a first cooling circuit with a first radiator for cooling of a coolant for cooling of the power electronics. A three way valve receives the coolant from the power electronics, and directs a portion of the coolant to a first coolant loop having a heat exchanger for cooling the electric machine, and the other portion of the coolant to a second coolant loop to cool refrigerant in a condenser of a refrigeration circuit. The coolant leaving the first coolant loop and the coolant leaving the second coolant loop are directed in a common line to a thermostat. If the coolant has a lower temperature than a regulating temperature of the thermostat, the coolant is directed back to a first coolant pump without cooling. If the coolant has a higher temperature than the regulating temperature of the thermostat, the coolant is directed to the first radiator for cooling. The cooling arrangement also has a second cooling circuit with coolant that is cooled by a second radiator and that is used to cool the electric energy storage. The coolant in the second cooling circuit may also be cooled by the refrigerant in the refrigeration circuit.

As described in the '208 publication, when ambient air temperature is low, the coolant in the first coolant circuit can be cooled by the first radiator in order to cool the power electronics, and the coolant in the second coolant circuit can be cooled by the second radiator to cool the electric energy storage. When ambient air temperature is higher or close to an optimal efficient operating temperature of the electric energy storage, the coolant in the second coolant circuit is cooled by the refrigeration circuit, as the second radiator cannot cool the coolant in the second coolant circuit to a temperature required to cool the electric energy storage. As a result, the coolant in the first coolant circuit can be cooled by the first radiator and the second radiator, and thus receives an increased heat transfer area with ambient air, and can be cooled to a lower temperature and provide more efficient cooling of the power electronics and the electric machine.

The cooling arrangement discussed in the '208 publication thus requires a refrigeration circuit and two radiators in order to sufficiently cool coolant in both the first coolant circuit and the second coolant circuit. The cooling arrangement is, therefore, relatively expensive, complex, and inefficient. Further, the cooling arrangement may not operate in extremely low ambient temperatures.

The liquid cool thermal management system and the related control method of the present disclosure may solve one or more of the problems set forth above and/or other problems in the art. The scope of the current disclosure, however, is defined by the attached claims, and not by the ability to solve any specific problem

SUMMARY

In one aspect, a thermal management system includes a first coolant circuit through which a first coolant circulates, the first coolant circuit including at least a radiator for cooling the first coolant, a storage containing one or more power electronics, a heat exchanger, and a thermostatic valve configured to output the first coolant to at least one of the storage containing the one or more power electronics and the heat exchanger. The thermal management system also includes a second coolant circuit through which a second coolant circulates, the second coolant circuit including at least the heat exchanger configured to cool the second coolant using the first coolant, an energy storage unit cooled by the second coolant, and a refrigeration unit configured to cool the second coolant. The thermal management system further includes a coolant temperature sensor configured to output a temperature of the coolant in the second coolant circuit, and a controller configured to control at least the refrigeration unit based on the temperature of the coolant output by the coolant temperature sensor. When the temperature of the coolant output by the coolant temperature sensor is greater than a refrigeration temperature threshold, the controller generates and sends a signal to turn on the refrigeration unit.

In another aspect, a thermal management system includes a radiator for cooling a first coolant in a first coolant circuit, a storage containing one or more power electronics, the storage being connected to the first coolant circuit, an energy storage unit connected to a second coolant circuit, wherein a second coolant in the second coolant circuit cools the energy storage unit, a heat exchanger connected to the first coolant circuit and to the second coolant circuit, the heat exchanger configured to exchange heat between the first coolant and the second coolant, and a thermostatic valve connected to the first coolant circuit, the thermostatic valve being configured to output the first coolant to at least one of the storage containing the one or more power electronics and the heat exchanger. The thermal management system also includes a refrigeration unit connected to the second coolant circuit, and configured to cool the second coolant, a coolant temperature sensor configured to output a temperature of the coolant in the second coolant circuit, and a controller configured to control at least the refrigeration unit based on the temperature of the coolant output by the coolant temperature sensor, wherein, when the temperature of the coolant output by the coolant temperature sensor is greater than an upper coolant temperature threshold, the controller generates and sends a signal to turn on the refrigeration unit.

In still another aspect, a method of controlling a thermal management system, the method includes circulating a first coolant in a first coolant circuit having a radiator for cooling the first coolant, a storage containing one or more power electronics, a heat exchanger, and a thermostatic valve configured to output the first coolant to at least one of the storage containing the one or more power electronics and the heat exchanger. The method also includes circulating a second coolant in a second coolant circuit having the heat exchanger configured to cool the second coolant using the first coolant, an energy storage unit cooled by the second coolant, and a refrigeration unit configured to cool the second coolant. Further, the method includes detecting, using a coolant temperature sensor, a temperature of the second coolant, and controlling, using a controller, the refrigeration unit based on the temperature of the coolant output by the coolant temperature sensor, wherein, when the temperature of the coolant output by the coolant temperature sensor is greater than an upper coolant temperature threshold, the controller generates and sends a signal to the refrigeration unit to turn on.

DETAILED DESCRIPTION

Both the foregoing general description and the following detailed description are exemplary and explanatory only and are not restrictive of the features, as claimed. As used herein, the terms "comprises," "comprising," "having," including," or other variations thereof, are intended to cover a non-exclusive inclusion, such that a process, method, article, or apparatus that comprises a list of elements does not include only those elements, but may include other elements not expressly listed or inherent to such a process, method, article, or apparatus. In addition, in this disclosure, relative terms, such as, for example, "about," "generally, "substantially," and "approximately" are used to indicate a possible variation of ±10% in the stated value.

Figure 1:
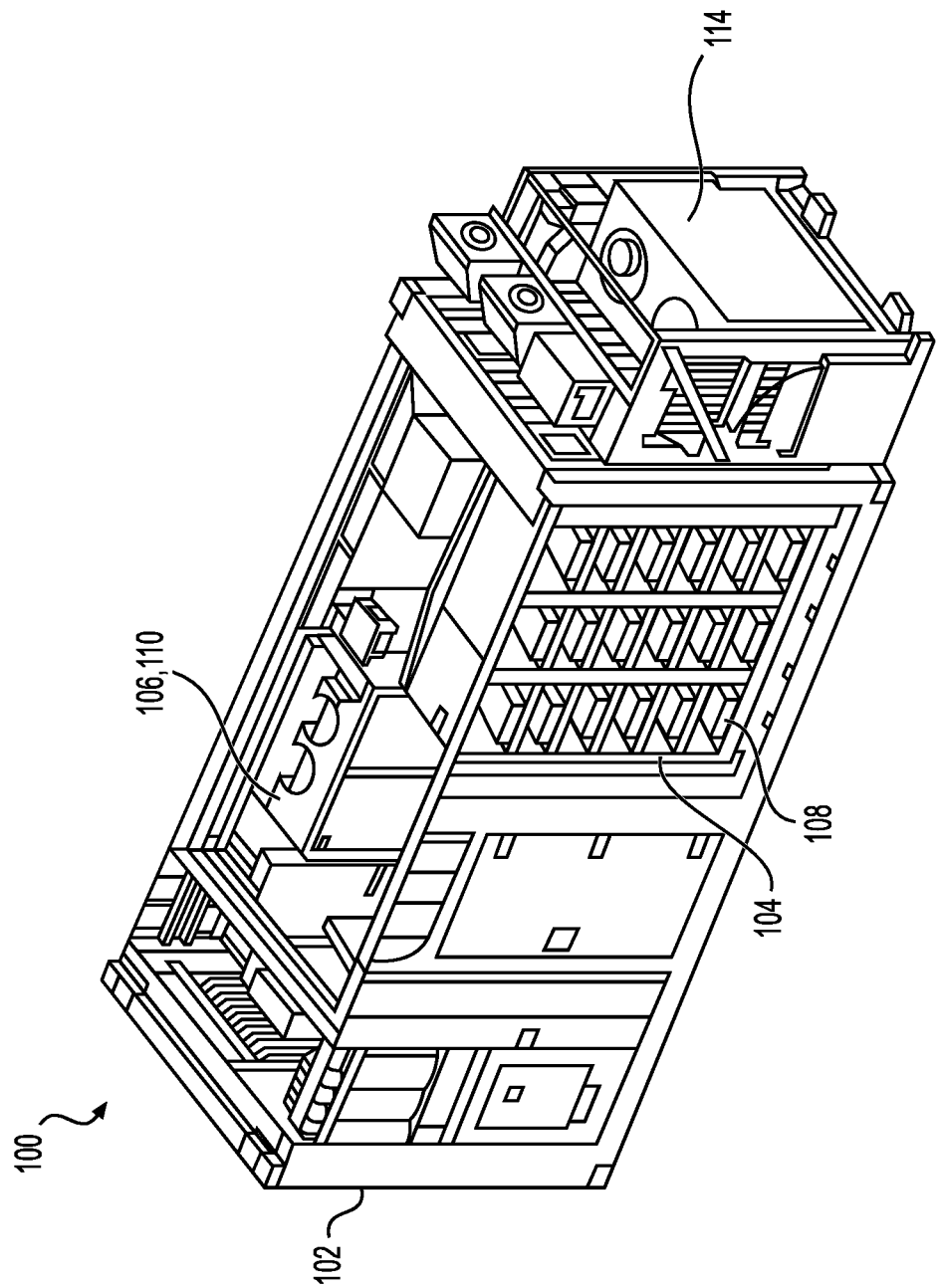
FIG. 1 shows a schematic view of a storage system, including a storage container that stores a back-up energy system, and a liquid cooled thermal management system, in accordance with the present disclosure.

FIG. 1 shows a schematic view of a battery storage system 100 according to an embodiment of the present disclosure. The battery storage system 100 has a storage container 102, battery storage 104, or a back-up energy storage unit, and a power electronics cabinet 106 contained therein. The battery storage 104 may contain energy storage units, for example, lithium ion batteries 108, as a back-up energy source. A temperature of the batteries 108 must be maintained within a temperature range of, for example, 10° C. to 30° C., The power electronics cabinet 106 may contain, for example, an inverter 110 that converts direct current (DC) power to alternating current (AC) power, and vice versa. The storage container 102 may be insulated, and may also contain a portion of a liquid cooled thermal management system 112, also referred to as a cooling system 112, shown in FIG. 2, which cools the battery storage 104 and the power electronics cabinet 106. The cooling system 112 connects to a refrigeration unit, or a chiller, 114, which may be located within or outside of the storage container 102. In the embodiment shown in FIG. 1, the chiller 114 is located outside of the storage container 102.

Figure 2:
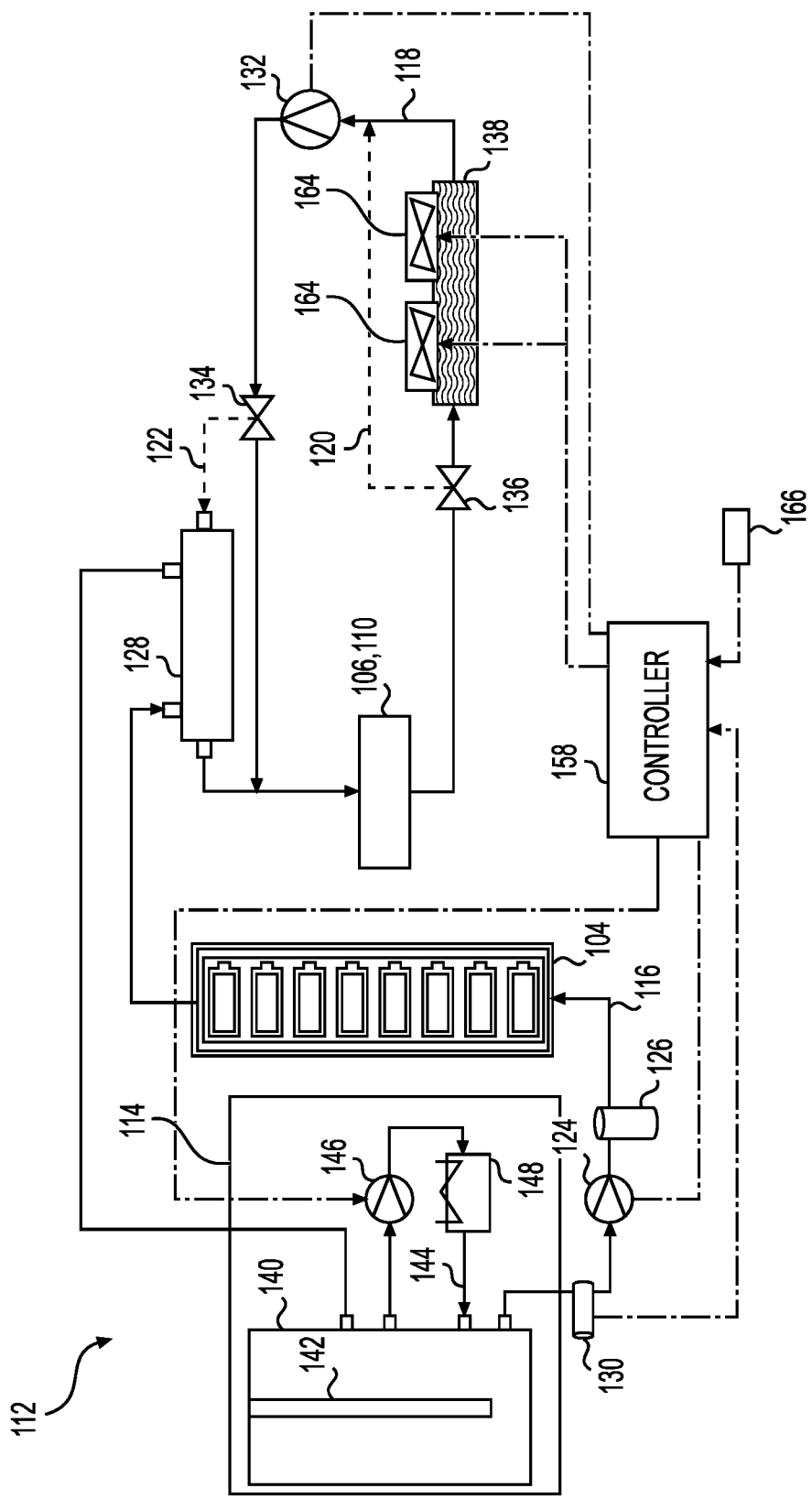
FIG. 2 shows a schematic diagram of the thermal management system shown in FIG. 1.

As shown in FIG. 2, the cooling system 112 includes an energy storage coolant circuit (ESCC) 116, a power electronics coolant circuit (PECC) 118, a radiator bypass circuit 120, and a heat exchanger circuit 122. A coolant circulates through the ESCC 116, and a coolant circulates through the PECC 118, the radiator bypass circuit 120, and the heat exchanger circuit 122. The two coolants may be the same type of coolant, or may be different types of coolants. In the present disclosure, the coolant that circulates through the ESCC 116, the PECC 118, the radiator bypass circuit 120, and the heat exchanger circuit 122 may be a 50%-50% glycol-water mixture, for example. The coolant is not, however, limited to the 50%-50% glycol-water mixture, and may be another coolant.

The ESCC 116 circulates the coolant from an energy storage coolant circuit pump (ESCC pump) 124, a filter 126, the battery storage 104, a heat exchanger (HEX) 128, the chiller 114, a coolant temperature sensor 130, back to the ESCC pump 124. The PECC 120 circulates the coolant from a power electronics coolant circuit pump (PECC pump) 132, a thermostatic valve 134, the power electronics cabinet 106, another thermostatic valve 136, and a radiator 138.

With reference to FIG. 2, the ESCC pump 124 maintains a flow rate of the coolant in the ESCC 116 to ensure proper absorption of heat by the coolant, while preventing build-up of heat around sensitive components of the ESCC 116. The ESCC pump 124 also maintains proper head pressure or vertical pressure, as the components of the ESCC 116 may be positioned at different heights within the cooling system 112. The ESCC pump 124 may be, for example, a centrifugal pump. The ESCC pump 124 pump is not, however, limited to this type of pump, and may be another type of pump. The filter 126 is downstream of the ESCC pump 124, and is formed of a media. The filter 126 traps debris or solids in the coolant output from the ESCC pump 124.

The battery storage 104 is downstream of the filter 126, and, as noted above, may contain energy storage units, for example, lithium ion batteries 108, as a back-up energy source. The batteries 108 are rated to operate within a battery operation temperature range of, for example, 10° C. to 30° C. at a pressure of 120 kPa.

The HEX 128 may be, for example, a plate heat exchanger, through which the coolant in the ESCC 116 and the coolant in the PECC 118 flow and exchange heat. The HEX 128 is not, however, limited to a plate heat exchanger, and may be another type of heat exchanger.

Figure 3:
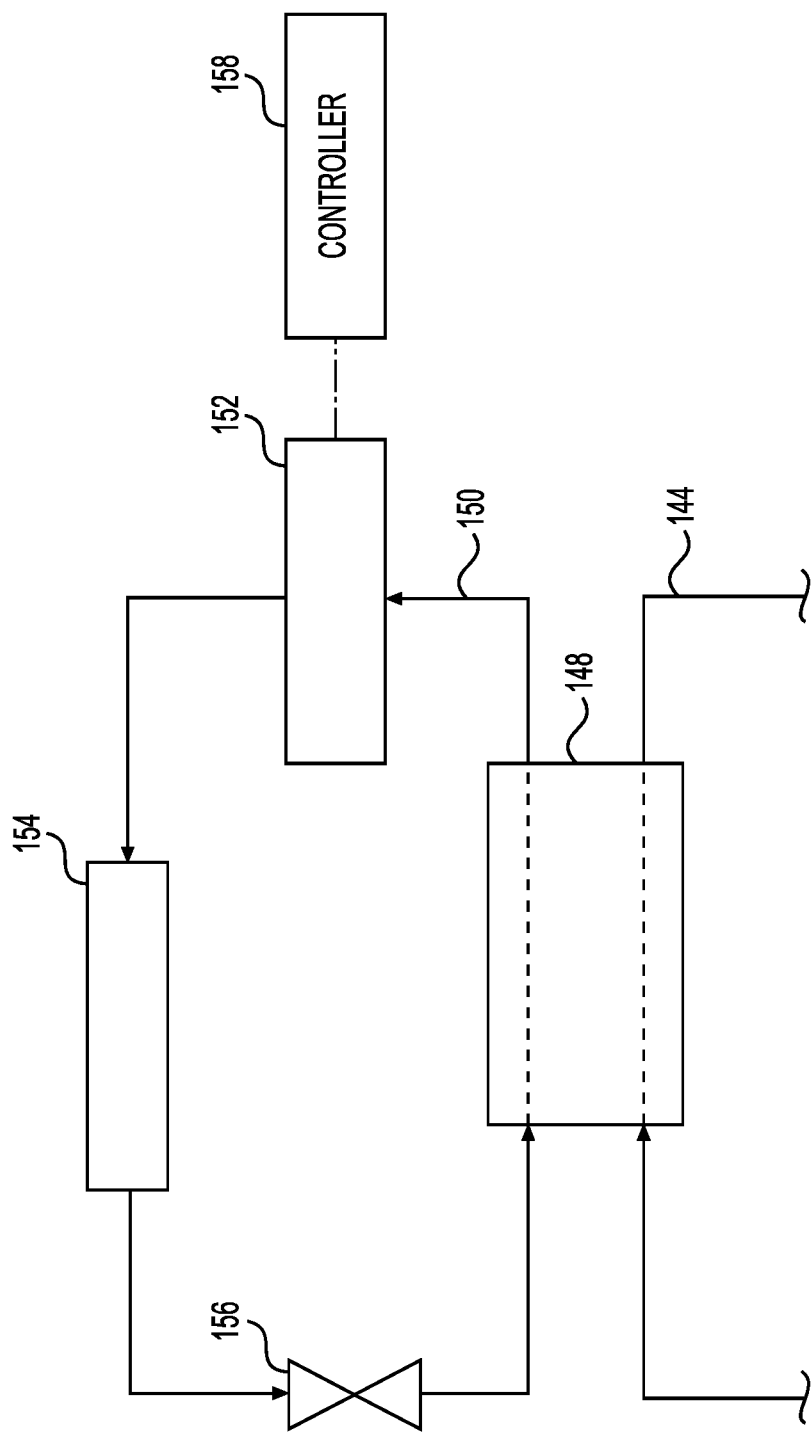
FIG. 3 shows a schematic diagram of a refrigeration circuit of the thermal management system shown in FIGS. 1 and 2.

The chiller 114 of the embodiment shown in FIGS. 1 and 2 may have a coolant tank 140, an immersion heater 142 provided within the coolant tank 140, and a chiller coolant circuit 144 connected to the coolant tank 140, and including a chiller pump 146, and a chiller heat exchanger (chiller HEX) 148. The chiller 114 also has a refrigeration circuit 150, connected to the chiller HEX 148, as shown in FIG. 3. The refrigeration circuit 150 circulates a refrigerant between the chiller HEX 148, a compressor 152, a condenser 154, and an expansion valve 156. The components of the chiller 114 are shown as being contained within a box in FIGS. 1 and 2, but, as described below with respect to an alternative embodiment, the components of the chiller 114 are not necessarily contained within one box.

Figure 4:
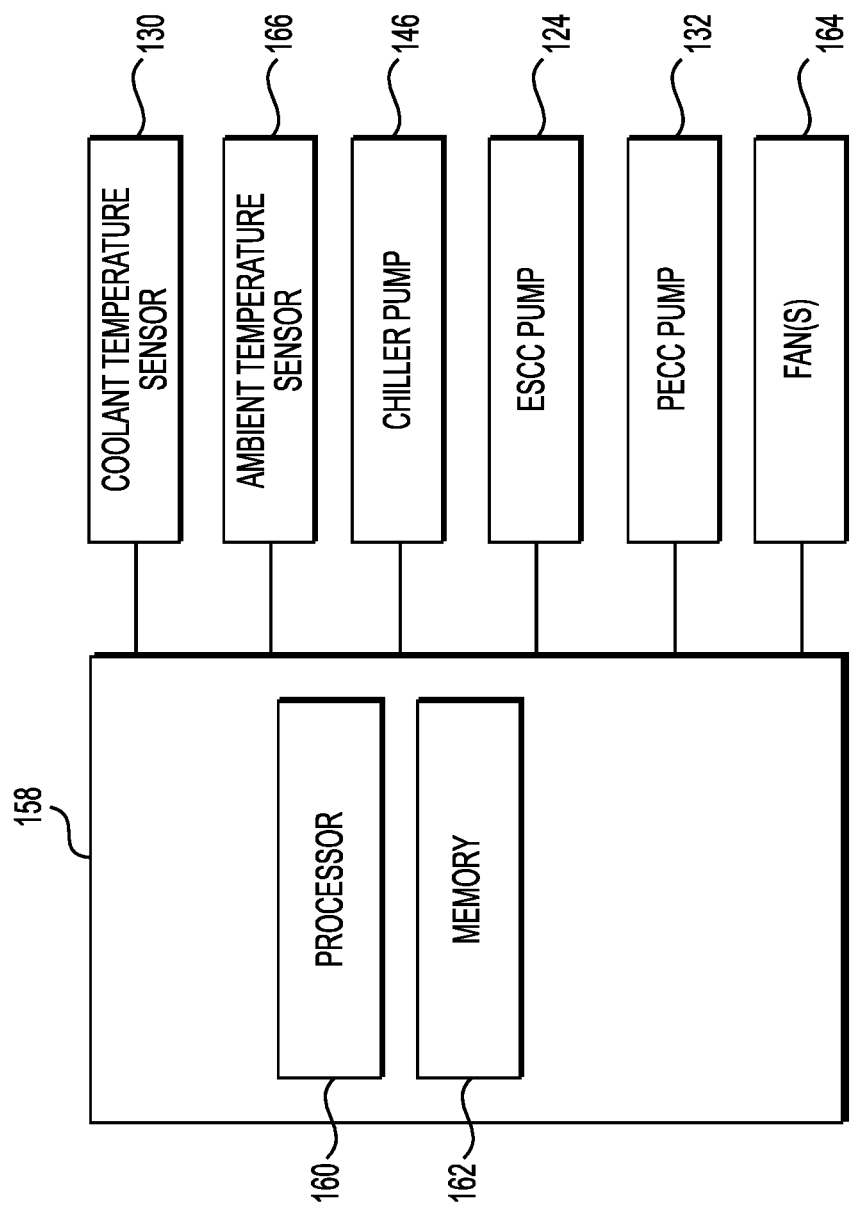
FIG. 4 shows a schematic diagram of a controller for the thermal management system shown in FIGS. 1 and 2.

The chiller 114, and, more specifically, the compressor 152 in the refrigeration circuit 150, is connected to a controller 158, as shown in FIG. 3. The coolant temperature sensor 130 is also connected to the controller 158, as shown in FIG. 2. As shown in FIG. 4, the controller 158 includes at least one processor 160 and at least one memory 162. The processor 160 may read out and execute programs stored in the memory 162 to generate and send electrical signals to one or more of the compressor 152 the chiller pump 146, and/or at least one fan 164, adjacent to the radiator 138, and described below. The memory 162 also stores one or more temperature threshold values, including, for example, upper and lower refrigeration temperature thresholds, a heater temperature threshold, and an ambient temperature threshold. The controller 158 may receive a coolant temperature, indicating a temperature of coolant flowing from the chiller 114, output from the coolant temperature sensor 130, and may use the received temperature to control the compressor 152. For example, if the coolant temperature received from the coolant temperature sensor 130 is greater than the upper refrigeration threshold, also referred to as a predefined temperature, the processor 160 may generate and send an electrical signal to the compressor 152 to turn ON. In addition, if the coolant temperature received from the coolant temperature sensor 130 is less than the lower refrigeration threshold, the processor 160 may generate and send an electrical signal to the compressor 152 to turn off. Further, the controller 158 may receive an output ambient temperature from an ambient temperature sensor 166, described below, and may use the received temperature to control the fans 164. For example, if the ambient temperature received from the ambient temperature sensor 166 is less than the ambient temperature threshold, the processor 160 may generate and send an electrical signal to the fans 164 to turn OFF.

With reference to FIG. 2, the PECC pump 132 maintains a flow rate of the coolant in the PECC 120 to ensure proper absorption of heat by the coolant, while preventing build-up of heat around sensitive components of the PECC 120. The PECC pump 132 also maintains proper head pressure or vertical pressure, as the components of the PECC 120 may be positioned at different heights within the cooling system 112. The PECC pump 132 may be, for example, a centrifugal pump. The PECC pump 132 is not, however, limited to this type of pump, and may be another type of pump.

The thermostatic valve 134 is downstream of the PECC pump 132, and receives the coolant from the PECC pump 132. The thermostatic valve 134 outputs the coolant to at least one of the power electronics cabinet 106 via the PECC 118, or to the HEX 128 via the heat exchanger circuit 122. The thermostatic valve 134 switches between a closed state, in which the thermostatic valve 134 may output some or all of the coolant to the power electronics cabinet 106, and a full open state, in which the thermostatic valve 134 may output all of the coolant to the HEX 128. When the thermostatic valve 134 is in the closed state, approximately 2% to 5% of the coolant flowing through the thermostatic valve 134 may leak to the heat exchanger circuit 122, while the remaining coolant flows to the power electronics cabinet 106 via the PECC 118. And, when the thermostatic valve 134 is in the full open state, there may be no leakage of the coolant from the thermostatic valve 134 to the portion of the PECC 118 between the thermostatic valve 134 and the power electronics cabinet 106. When a temperature of the coolant flowing through the thermostatic valve 134 is greater than a closed valve temperature threshold of, for example, 25° C., the thermostatic valve 134 remains in the closed state, and most or all of the coolant flows to the power electronics cabinet 106. When the temperature of the coolant flowing through the thermostatic valve 134 is within a range of temperatures of, for example, 15° C. to 25° C., the thermostatic valve 134 gradually moves from the closed state toward the full open state. As the thermostatic valve 134 moves from the closed state to the full open state, or from the full open state to the closed state, the amount of coolant that flows to the power electronics cabinet 106 via the PECC 118 and the amount of coolant that flows to the HEX 128 change proportionately to each other. And, when the temperature of the coolant flowing through the thermostatic valve 134 is less than an open valve temperature threshold of, for example, 15° C., the thermostatic valve 134 is in the full open state, and all of the coolant flows to the HEX 128.

The power electronics cabinet 106 is downstream of the thermostatic valve 134 and the HEX 128, and, as noted above, may include the inverter 110 used to convert DC power to AC power to be supplied to the power electronics components. The power electronics cabinet 106, and the inverter 110 and other power electronics stored in the power electronics cabinet 106, is cooled by the coolant that flows through the PECC 120, as described in more detail below. That is, the coolant that flows through the power electronics cabinet 106 absorbs heat in the power electronics cabinet 106, thereby cooling the inverter 110 and the other power electronics stored in the power electronics cabinet 106.

The other thermostatic valve 136 is downstream of the power electronics cabinet 106, and outputs the coolant to at least one of the radiator 138 via the PECC 118, or to the radiator bypass circuit 120. The other thermostatic valve 136 may be referred to as an over-cooling prevention valve. The over-cooling prevention valve 136 switches between a closed state, in which the over-cooling prevention valve 136 may output some or all of the coolant to the radiator 138, and a full open state, in which the over-cooling prevention valve 136 may output all of the coolant to radiator bypass circuit 120. When the over-cooling prevention valve 136 is in the closed state, approximately 2% to 5% of the coolant flowing through the over-cooling prevention valve 136 may leak to the radiator bypass circuit 120, while the remaining coolant flows to the radiator 138 via the PECC 118. And, when the over-cooling prevention valve 136 is in the full open state, there may be no leakage of the coolant from the over-cooling prevention valve 136 to the radiator 138. When a temperature of the coolant flowing through the over-cooling prevention valve 136 is greater than a closed valve temperature threshold of, for example, 25° C., the thermostatic valve 136 remains in the closed state, and all or most of the coolant, apart from the small leakage amount noted above, flows to the radiator 138. When the temperature of the coolant flowing through the over-cooling prevention valve 136 is within a range of temperatures of, for example, 15° C. to 25° C., the over-cooling prevention valve 136 gradually moves from the closed state toward the full open state. As the over-cooling prevention valve 136 moves from the closed state to the full open state, or from the full open state to the closed state, the amount of coolant that flows to the radiator 138 via the PECC 118 and the amount of coolant that flows to radiator bypass circuit 120 change proportionately to each other. And, when the temperature of the coolant flowing through the over-cooling prevention valve 136 is less than an open valve temperature threshold of, for example, 15° C., the over-cooling prevention valve 136 is in the full open state, in which all of the coolant flows through the radiator bypass circuit 120. The coolant that flows through the radiator 138 and the radiator bypass circuit 120 returns to the PECC pump 132, as shown in FIG. 2.

The radiator 138 is downstream of the thermostatic valve 138 in the PECC 118, and may be connected to least one fan 164, which may be positioned adjacent to the radiator 138 to force air across the radiator 138 and thereby cool the coolant flowing through the radiator 138. This arrangement may be a forced-convection type radiator. The radiator 138 is not, however, limited to the forced-convection type radiator, and may be another type of radiator, such as a natural-convection type radiator and/or a liquid cooled radiator.

An ambient temperature sensor 166 may also be provided, and is connected to the controller 158, as shown in FIG. 2. The ambient temperature sensor 166 outputs ambient temperature to the controller 158. If the output ambient temperature is less than an ambient temperature threshold of, for example, −5° C., a temperature of the coolant in the PECC 118 may become too low. Accordingly, the controller 158 stops power supply to the fan 164 when the output ambient temperature is less than the ambient temperature threshold.

INDUSTRIAL APPLICABILITY

The cooling system 112 of the present disclosure provides for cooling of components of a battery storage system 100, and, in particular, efficient cooling of a battery storage 104 to maintain the batteries 108 in the battery storage 104 within an operating temperature range, when exposed to a wide range of ambient temperatures. In particular, by use of a combination of the ESCC 116, for cooling the battery storage 104, and the PECC 118, for cooling of the power electronics cabinet 106, the cooling system 112 of the present disclosure reduces a use and, therefore, a power consumption, of the compressor 152 of the chiller 114 to cool the battery storage 104. The reduction in use of the chiller 114 reduces the overall power consumption of the chiller 114 and increases an efficiency of the chiller 114. Further, the cooling system 112 of the present disclosure provides for cooling of components of the battery storage system 104 by taking advantage of low ambient temperatures, that is, ambient temperatures less than 30° C. In particular, by use of the radiator 138 and the fans 164, as well as the controller 158 and the ambient temperature sensor 166, the cooling system 112 of the present disclosure reduces use of the compressor 152 of the chiller 114, instead using the radiator 138 and the fan 164 to cool the coolant in the ESCC 116 and the coolant in the PECC 118 when ambient temperatures fall below an ambient temperature threshold.

When the battery storage system 100 is in use, the ESCC pump 124 and the PECC pump 132 are powered on to circulate the coolant in the ESCC 116 and the PECC 118, respectively. With reference to FIG. 2, the coolant in the ESCC 116 flows, in the direction shown by the arrows in FIG. 2, from the ESCC pump 124 through the filter 126, which traps and removes debris or solids from the coolant. The coolant then flows to the battery storage 104. The coolant that flows through the battery storage 104 absorbs heat output by the batteries 108. That is, as the batteries 108 output power, the batteries 108 generate and output heat within the storage container 102. The coolant flowing through the battery storage 104 absorbs the heat within the energy storage 104.

The coolant then flows into the HEX 128, in which coolant in the ESCC 116 can be cooled by the coolant in the PECC 118 passing through the HEX 128. For example, the coolant in the ESCC 116 may have a temperature of 30° C. before entering the HEX 128, and may be cooled to a temperature of 0° C. in the HEX 128. Then, the coolant flows to the coolant tank 140 of the chiller 114. A temperature of the coolant in the ESCC 116 is output from the coolant temperature sensor 130 to the controller 156. If the detected temperature of the coolant is less than or equal to the lower refrigeration temperature threshold, the coolant does not require additional cooling by the chiller HEX 148 and the refrigeration circuit 150. If the detected temperature of the coolant is greater than the upper refrigeration temperature threshold of, for example, 30° C., the compressor 152 in the refrigeration circuit 150 may be started (i.e., powered on) by the controller 158, so the coolant in the coolant tank 140 flows through the refrigeration circuit 150 to be cooled. With reference to FIG. 3, in the refrigeration circuit 150, the coolant flows through the chiller HEX 148 and is cooled by the refrigerant that flows through the refrigeration circuit 150. If the detected coolant temperature is less than a heater temperature threshold of, for example, 10° C., as may be the case when ambient temperature is low, the immersion heater 142 may be started to heat the coolant in the coolant tank 140. The coolant then returns to the coolant tank 140, and flows from the coolant tank 140, out of the chiller 114, and back to the ESCC pump 124.

With reference to FIG. 2, when the PECC pump 132 is powered on, the coolant in the PECC 118 flows from the PECC pump 132 to the thermostatic valve 134. As noted above, the thermostatic valve 134 outputs the coolant to at least one of the power electronics cabinet 106 via the PECC 118, or to the HEX 128 via the heat exchanger circuit 122. The thermostatic valve 134 switches between the closed state, in which the thermostatic valve 134 may output some or all of the coolant to the power electronics cabinet 106, and the full open state, in which the thermostatic valve 134 may output all of the coolant to the HEX 128, depending on a temperature of the coolant in the PECC 116. In particular, when the temperature of the coolant flowing through the thermostatic valve 134 is greater than the closed valve temperature threshold of, for example, 25° C., the thermostatic valve 134 remains in the closed state. And, when the temperature of the coolant flowing through the thermostatic valve 134 is within a range of temperatures of, for example, 15° C. to 25° C., the thermostatic valve 134 gradually moves from the closed state toward the full open state. Further, when the temperature of the coolant flowing through the thermostatic valve 134 is less than the open valve temperature valve of, for example, 15° C., the thermostatic valve 134 is in the full open state.

In the HEX 128, the coolant from the PECC 118 absorbs heat from the coolant from the ESCC 116. That is, the coolant from the PECC 118 cools the coolant from the ESCC 116. The flow rate of the coolant from the ESCC 116 and the flow rate of the coolant from the PECC 118 determine an amount of heat absorbed by the coolant from the PECC 118. For example, the coolant from the PECC 118 may only absorb a limited amount of heat from the coolant from the ESCC 116, in order to maintain a sufficiently low temperature of the coolant to cool the power electronics cabinet 106. Then, the coolant from the PECC 118 flows from the HEX 128 to the power electronics cabinet 106. With this arrangement, a temperature of the coolant in the PECC 118 that enters the HEX 128 can be maintained, for example, below 10° C. As a result, the power electronics cabinet 106 and the coolant in the ESCC 116 may be sufficiently cooled by the coolant in the PECC 118.

The coolant in the PECC 118 flows from either or both of the thermostatic valve 134 and the HEX 128, depending on the state of the thermostatic valve 134, as described above, to the power electronics cabinet 106. In the power electronics cabinet 106, the coolant absorbs heat from the items stored in the power electronics cabinet 106, such as the inverter 110, and thereby cools the items stored in the power electronics cabinet 106. Power electronics, such as the inverter 110, can withstand high temperatures, for example up to 100° C. The power electronics stored in the power electronics cabinet may be cooled to a temperature of, for example, 70° C. or less.

From the power electronics cabinet 106, the coolant in the PECC 118 flows to the over-cooling prevention valve 136. As noted above, the over-cooling prevention valve 136 outputs the coolant to at least one of the radiator 138 via the PECC 118, or to the radiator bypass circuit 120. The over-cooling prevention valve 136 switches between the closed state, in which the over-cooling prevention valve 136 may output some or all of the coolant to the radiator 138, and the full open state, in which the over-cooling prevention valve 136 may output all of the coolant to radiator bypass circuit 120, depending on the temperature of the coolant flowing into the over-cooling prevention valve 136. In particular, when the temperature of the coolant flowing through the over-cooling prevention valve 136 is greater than the closed valve temperature threshold of, for example, 25° C., the over-cooling prevention valve 136 remains in the closed state, and all or most of the coolant, apart from a leakage amount of 2% to 5%, may flow through the radiator 138 to be cooled by the radiator 138 and the fan 164. When the temperature of the coolant flowing through the over-cooling prevention valve 136 is within a range of temperatures of, for example, 15° C. to 25° C., the over-cooling prevention valve 136 gradually moves from the closed state toward the full open state. Finally, when the temperature of the coolant flowing through the over-cooling prevention valve 136 is less than the open valve temperature threshold of, for example, 15° C., the over-cooling prevention valve 136 is in the full open state, and all of the coolant flows through the radiator bypass circuit 120. In the radiator 138, the coolant in the PECC 118 is cooled by ambient air passing through the radiator 138 by force of the fan 164. The coolant that flows through the radiator 138 and the radiator bypass circuit 120 then returns to the PECC pump 132, as shown in FIG. 2.

Figure 5:
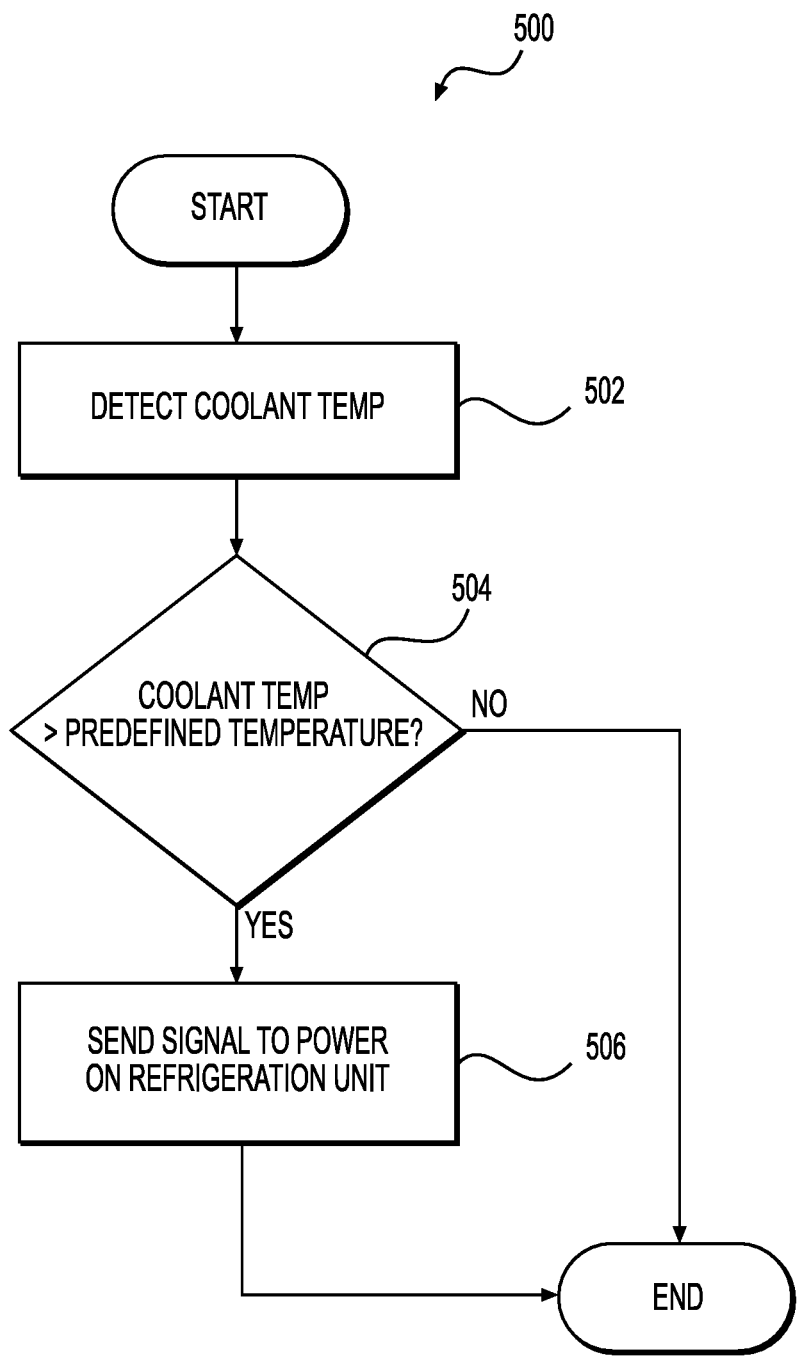
FIG. 5 shows a flowchart for a method of controlling the thermal management system shown in FIGS. 1 and 2.

FIG. 5 shows a method 500 of controlling the cooling system 112 according to the present disclosure. In step 502, a temperature of the coolant in the ESCC 116 is detected by the coolant temperature sensor 130. Next, in step 504, the controller 158 determines whether the temperature output by the coolant temperature sensor 130 is greater than the upper refrigeration temperature threshold stored in the memory 162. When the temperature output by the coolant temperature sensor 130 is greater than the upper refrigeration temperature threshold, in step 506, the controller 158 sends a signal, generated by the processor 160, to power on the compressor 152. The compressor 152 then circulates the refrigerant in the chiller coolant circuit 144 to cool the coolant in the chiller HEX 148. The compressor 152 remains on until the temperature output by the coolant temperature sensor 130 becomes less than or equal to the upper chiller temperature threshold. If the temperature output by the coolant temperature sensor 130 is not greater than the upper refrigeration temperature threshold, the method returns to step 502, to continue detecting the coolant temperature. The method 500 then ends. The method 500 may be executed as a loop, i.e., repeatedly, while the batteries 108 are in use and outputting power.

Although the method 500 is described as including steps 502 to 506, the method may include additional steps. For example, the method 500 may include a step of starting supply of power from the batteries 108, a step of powering on the ESCC pump 124 to circulate the coolant in the ESCC 116, and/or powering on the PECC pump 132 to begin circulating the coolant in the PECC 118, via the controller 158. In these embodiments, the controller 158 is connected to a switch (unshown) connected to the batteries 108, the ESCC pump 124, and/or the PECC pump 132. The method 500 may also include a step of sending a signal from the controller 158 to the chiller pump 146 to power on and circulate the coolant from the coolant tank 140 through the chiller HEX 148.

Further, the method 500 may include a step of receiving ambient temperature from the ambient temperature sensor 166. If the received ambient temperature is less than the ambient temperature threshold of, for example, −5° C., the controller 158 may stop power supply to the fan 164, in order to prevent a temperature of the coolant in the PECC 118 from becoming too low. Further, the method 500 may include a step of stopping power to the compressor 152 if the received ambient temperature is less than the lower refrigeration temperature threshold of, for example, 15° C., and, in this case, the radiator 138 is used to cool the coolant in both the ESCC 116 and the PECC 118. That is, the radiator 138 is used to cool both the battery storage 104 and the items stored in the power electronics cabinet 106 via the HEX 128. This embodiment takes advantage of low ambient temperatures to cool the coolant in both the ESCC 116 and the PECC 118, as ambient temperatures in North America, for example, are less than 30° C. for most of the year.

In addition, although the battery storage system 100 described above and shown in FIG. 1 may include the storage container 102, which contains the battery storage 104 and the power electronics cabinet 106, the battery storage system 100 may be used in any electrical machine, such as an electric vehicle. In such an embodiment, the battery storage 104 and a power electronics container (comparable to the power electronics cabinet 106) may be contained within the vehicle. The battery storage 104 stores a battery of the vehicle, as the energy source 108, and the power electronics container contains the inverter 110. A radiator of the vehicle serves as the radiator 138 that is used to cool both a motor of the vehicle as well as the power electronics container, and a cooling system of the vehicle serves as the refrigeration unit 114 that is used to cool a cabin of the vehicle. The cooling system of the vehicle, like the refrigeration unit 114 described above, also cools the coolant circulating through the radiator 138. In addition, the components of the cooling system are the same as those of the refrigeration unit 114, but are contained within the vehicle, rather than within one box.

The cooling system 112 of the present disclosure and the related method 500 for controlling the cooling system 112 provide for cooling of battery storage 104 and a power electronics cabinet 106, in a relatively efficient manner and in a wide range of ambient temperatures. In particular, by virtue of the HEX 128 and the chiller 114 of the ESCC 116, coolant that flows in the ESCC 116 can be efficiently cooled when ambient temperatures are less than, for example, 15° C. In particular, by only turning on the compressor 152 when the temperature of the coolant becomes greater than the upper refrigeration temperature threshold, the controller 158 of the cooling system 112 reduces a usage amount, that is, an energy consumption, of the compressor 152, thereby improving the overall efficiency of the battery storage system 100. And, therefore, the batteries 108, which operate within a relatively narrow range of temperatures and generate heat during use, can be cooled more efficiently. In addition, by virtue of the radiator 138, which cools the coolant in the PECC 118 flowing to the HEX 128, the coolant in the ESCC 116 can be cooled using the radiator 138, reducing use of the chiller 114. The battery storage system 100, therefore, has increased efficiency and decreased costs due to the reduction in use of the chiller 114. The cooling system 112 also has increased efficiency by taking advantage of low ambient temperatures, e.g., ambient temperatures less than 30° C., to cool the coolant in the PECC 118 using the radiator 138 and the fans 164, and to thereby cool the coolant in the ESCC 116 via the HEX 128. Further, the battery storage system 100 has increased efficiency when used in extremely low ambient temperatures by virtue of the controller 158, the thermostatic valve 134, the over-cooling prevention valve 136, and the ambient temperature sensor 166. In particular, by use of the thermostatic valve 134 and the over-cooling prevention valve 136 in the PECC 118, the cooling system 112 may continue to provide coolant to cool the batteries 108 as well as the items stored in the power electronics cabinet 106, without use of the chiller 114 or the radiator 138 and the fans 164, under certain conditions. This, in turn, reduces an overall power consumption of the chiller 114 and, therefore, increases the efficiency of the battery storage system 100.

It will be apparent to those skilled in the art that various modifications and variations can be made to the disclosed cooling system and related method of controlling the cooling system without departing from the scope of the disclosure. Other embodiments of the cooling system and the related method of controlling the cooling system will be apparent to those skilled in the art from consideration of the specification and the accompanying figures. It is intended that the specification, and, in particular, the examples provided herein be considered as exemplary only, with a true scope of the disclosure being indicated by the following claims and their equivalents.

We claim:

1. A thermal management system comprising:
   a first coolant circuit through which a first coolant circulates, the first coolant circuit including at least:
      a radiator for cooling the first coolant;
      a storage containing one or more power electronics;
      a liquid-to-liquid heat exchanger; and
      a thermostatic valve configured to output the first coolant to at least one of the storage containing the one or more power electronics and the liquid-to-liquid heat exchanger;
   a second coolant circuit through which a second coolant circulates, the second coolant circuit including at least:
      the liquid-to-liquid heat exchanger configured to cool the second coolant using the first coolant;
      an energy storage unit cooled by the second coolant; and
      a refrigeration unit configured to cool the second coolant;
   a coolant temperature sensor configured to output a temperature of the coolant in the second coolant circuit; and
   a controller configured to control at least the refrigeration unit based on the temperature of the coolant output by the coolant temperature sensor, wherein, when the temperature of the coolant output by the coolant temperature sensor is greater than a refrigeration temperature threshold, the controller generates and sends a signal to turn on the refrigeration unit.

2. The thermal management system of claim 1, wherein the refrigeration temperature threshold is 30° C.

3. The thermal management system of claim 1, wherein, when the coolant temperature output by the coolant temperature sensor is less than or equal to a lower refrigeration temperature threshold, the controller turns off the refrigeration unit.

4. The thermal management system of claim 3, wherein the refrigeration unit further includes an immersion heater, and wherein, when the coolant temperature output by the coolant temperature sensor is less than a heating temperature threshold of 10° C., the controller turns on the immersion heater.

5. The thermal management system of claim 1, further comprising:
   one or more fans provided adjacent to the radiator, and configured to move air across the radiator; and
   an ambient temperature sensor connected to the controller, wherein, when ambient temperature output by the ambient temperature sensor is less than an ambient temperature threshold, the controller generates and sends a signal to turn off the one or more fans.

6. The thermal management system of claim 1, wherein the thermostatic valve switches between a closed state, in which the thermostatic valve outputs the first coolant to the storage containing the power electronics, and a fully opened state, in which the thermostatic valve outputs the first coolant to the liquid-to-liquid heat exchanger, and
   wherein, between the closed state and the fully opened state, the thermostatic valve outputs the first coolant to both the storage containing the power electronics and the liquid-to-liquid heat exchanger.

7. The thermal management system of claim 1, wherein the first coolant circuit further includes:
   a radiator bypass circuit that bypasses the radiator; and
   another thermostatic valve provided between the power electronics cabinet and the radiator and connected to the first coolant circuit and the radiator bypass circuit, the other thermostatic valve switching between a closed state, in which the other thermostatic valve outputs the first coolant to the radiator, and a fully opened state, in which the other thermostatic valve outputs the first coolant to a point in the first coolant circuit downstream of the radiator, thereby bypassing the radiator, and
   wherein, between the closed state and the fully opened state, the other thermostatic valve outputs the first coolant to both the storage containing the power electronics and the liquid-to-liquid heat exchanger.

8. A thermal management system comprising:
   a radiator for cooling a first coolant in a first coolant circuit;
   a storage containing one or more power electronics, the storage being connected to the first coolant circuit;
   an energy storage unit connected to a second coolant circuit, wherein a second coolant in the second coolant circuit cools the energy storage unit;

a heat exchanger connected to the first coolant circuit and to the second coolant circuit, the heat exchanger configured to exchange heat between the first coolant and the second coolant, wherein the first coolant circuit and the second coolant circuit extend as separate flow paths through the heat exchanger;

a thermostatic valve connected to the first coolant circuit, the thermostatic valve being configured to output the first coolant to at least one of the storage containing the one or more power electronics and the heat exchanger;

a refrigeration unit connected to the second coolant circuit, and configured to cool the second coolant;

a coolant temperature sensor configured to output a temperature of the coolant in the second coolant circuit; and a controller configured to control at least the refrigeration unit based on the temperature of the coolant output by the coolant temperature sensor, wherein, when the temperature of the coolant output by the coolant temperature sensor is greater than an upper coolant temperature threshold, the controller generates and sends a signal to turn on the refrigeration unit.

9. The thermal management system of claim 8, wherein the upper coolant temperature threshold is 30° C.

10. The thermal management system of claim 8, wherein, when the coolant temperature output by the coolant temperature sensor is less than or equal to a lower coolant temperature threshold, the controller turns off the refrigeration unit.

11. The thermal management system of claim 10, wherein the refrigeration unit further includes an immersion heater, and wherein, when the coolant temperature output by the coolant temperature sensor is less than a heating temperature threshold of 10° C., the controller turns on the immersion heater.

12. The thermal management system of claim 8, further comprising:
one or more fans provided adjacent to the radiator, and configured to move air across the radiator; and
an ambient temperature sensor connected to the controller, wherein, when ambient temperature output by the ambient temperature sensor is less than an ambient temperature threshold, the controller generates and sends a signal to turn off the one or more fans.

13. The thermal management system of claim 8, wherein the thermostatic valve switches between a closed state, in which the thermostatic valve outputs the first coolant to the storage containing the power electronics, and a fully opened state, in which the thermostatic valve outputs the first coolant to the heat exchanger, and
wherein, between the closed state and the fully opened state, the thermostatic valve outputs the first coolant to both the storage containing the power electronics and the heat exchanger.

14. The thermal management system of claim 8, further comprising:
a radiator bypass circuit that bypasses the radiator in the first coolant circuit; and
another thermostatic valve provided between the power electronics cabinet and the radiator and connected to the first coolant circuit and the radiator bypass circuit, the other thermostatic valve switching between a closed state, in which the other thermostatic valve outputs the first coolant to the radiator, and a fully opened state, in which the other thermostatic valve outputs the first coolant to a point in the first coolant circuit downstream of the radiator, thereby bypassing the radiator, and
wherein, between the closed state and the fully opened state, the other thermostatic valve outputs the first coolant to both the storage containing the power electronics and the heat exchanger.

15. A method of controlling a thermal management system, the method comprising:
circulating a first coolant in a first coolant circuit having:
a radiator for cooling the first coolant;
a storage containing one or more power electronics;
a liquid-to-liquid heat exchanger; and
a thermostatic valve configured to output the first coolant to at least one of the storage containing the one or more power electronics and the heat exchanger;
circulating a second coolant in a second coolant circuit having:
the liquid-to-liquid heat exchanger configured to cool the second coolant using the first coolant;
an energy storage unit cooled by the second coolant; and
a refrigeration unit configured to cool the second coolant;
cooling, using the liquid-to-liquid heat exchanger, the second coolant using the first coolant;
detecting, using a coolant temperature sensor, a temperature of the second coolant; and
controlling, using a controller, the refrigeration unit based on the temperature of the coolant output by the coolant temperature sensor, wherein, when the temperature of the coolant output by the coolant temperature sensor is greater than an upper coolant temperature threshold, the controller generates and sends a signal to the refrigeration unit to turn on.

16. The method of claim 15, wherein the upper coolant temperature threshold is 30° C.

17. The method of claim 15, wherein, when the coolant temperature output by the coolant temperature sensor is less than or equal to a lower coolant temperature threshold, the controller turns off the refrigeration unit.

18. The method of claim 17, wherein the first coolant circuit further includes one or more fans provided adjacent to the radiator, and configured to move air across the radiator, and
wherein the method further comprises:
detecting ambient temperature using an ambient temperature sensor; and
controlling, using the controller, the one or more fans, and
wherein, when ambient temperature output by the ambient temperature sensor is less than an ambient temperature threshold, the controller generates and sends a signal to turn off the one or more fans.

19. The method of claim 15, further comprising switching the thermostatic valve between:
a closed state, in which the thermostatic valve outputs the first coolant to the storage containing the power electronics;
a fully opened state, in which the thermostatic valve outputs the first coolant to the liquid-to-liquid heat exchanger; and
positions between the closed state and the fully opened state, in which the thermostatic valve outputs the first coolant to both the storage containing the power electronics and the liquid-to-liquid heat exchanger.

20. The method of claim 15, wherein the refrigeration unit further includes an immersion heater, and the method further comprises turning on, using the controller, the immersion heater when the coolant temperature output by the coolant temperature sensor is less than a heating temperature threshold of 10° C.

* * * * *